United States Patent
Zhang et al.

(10) Patent No.: US 10,993,547 B2
(45) Date of Patent: May 4, 2021

(54) END MEMBER FOR FASTENING COVER MATERIAL

(71) Applicant: YKK Corporation, Tokyo (JP)

(72) Inventors: Wanli Zhang, Kurobe (JP); Hikaru Okuyama, Kurobe (JP); Ryuichi Murasaki, Tokyo (JP); Toshiaki Takizawa, Kurobe (JP); Kenji Dono, Kurobe (JP)

(73) Assignee: YKK Corporation

( * ) Notice: Subject to any disclaimer, the term of this patent is extended or adjusted under 35 U.S.C. 154(b) by 302 days.

(21) Appl. No.: 16/087,538

(22) PCT Filed: Mar. 23, 2016

(86) PCT No.: PCT/JP2016/059164
§ 371 (c)(1),
(2) Date: Sep. 21, 2018

(87) PCT Pub. No.: WO2017/163329
PCT Pub. Date: Sep. 28, 2017

(65) Prior Publication Data
US 2020/0375371 A1    Dec. 3, 2020

(51) Int. Cl.
*A47C 31/02* (2006.01)
*B60N 2/58* (2006.01)
*B68G 7/12* (2006.01)

(52) U.S. Cl.
CPC .......... *A47C 31/023* (2013.01); *B60N 2/5825* (2013.01); *B60N 2/5883* (2013.01); *B68G 7/12* (2013.01)

(58) Field of Classification Search
CPC ........ A47C 31/023; A47C 31/02; B68G 7/12; B68G 7/052; B60N 2/5825; B60N 2/5883
See application file for complete search history.

(56) References Cited

U.S. PATENT DOCUMENTS

| | | |
|---|---|---|
| 2009/0140569 A1 | 6/2009 | Mashimo |
| 2014/0352117 A1 | 12/2014 | Murasaki |

(Continued)

FOREIGN PATENT DOCUMENTS

| | | |
|---|---|---|
| JP | 3186511 U | 10/2007 |
| JP | 2009-100924 A | 5/2009 |

(Continued)

OTHER PUBLICATIONS

Office Action, Korean Patent Application No. 10-2018-7027728, dated Dec. 10, 2019.

(Continued)

*Primary Examiner* — Robert Sandy
*Assistant Examiner* — Louis A Mercado
(74) *Attorney, Agent, or Firm* — Kilpatrick Townsend & Stockton LLP

(57) ABSTRACT

There is provided a cover-material fastening end member including a band-shaped member and a locking member. The locking member is formed such that a width thereof in a direction perpendicular to a surface of the band-shaped member is wider than a width of the band-shaped member. The locking member includes: a center plate-shaped portion, a flange portion, and a plurality of rib portions. The flange portion has a surface extending along a longitudinal direction of the end edge portion of the band-shaped member and perpendicular to a surface of the center plate-shaped portion. The rib portions each has a surface intersecting with the center plate-shaped portion and the flange portion. The rib portions are provided on the center plate-shaped portion along the longitudinal direction of the center plate-shaped portion at predetermined intervals.

8 Claims, 23 Drawing Sheets

(56) References Cited

U.S. PATENT DOCUMENTS

2015/0033516 A1   2/2015   Saiga et al.
2016/0174719 A1   6/2016   Saiga et al.
2016/0249746 A1   9/2016   Saiga et al.
2018/0352962 A1  12/2018   Saiga et al.

FOREIGN PATENT DOCUMENTS

| JP | 2009-148407 A | 7/2009 |
| WO | 2013/069114 A1 | 5/2013 |
| WO | 2015/029131 A1 | 3/2015 |
| WO | 2015/068311 A1 | 5/2015 |

OTHER PUBLICATIONS

International Search Report, PCT Patent Application No. PCT/JP2016/059164, dated Jun. 21, 2016.
Written Opinion, PCT Patent Application No. PCT/JP2016/059164, dated Jun. 21, 2016.

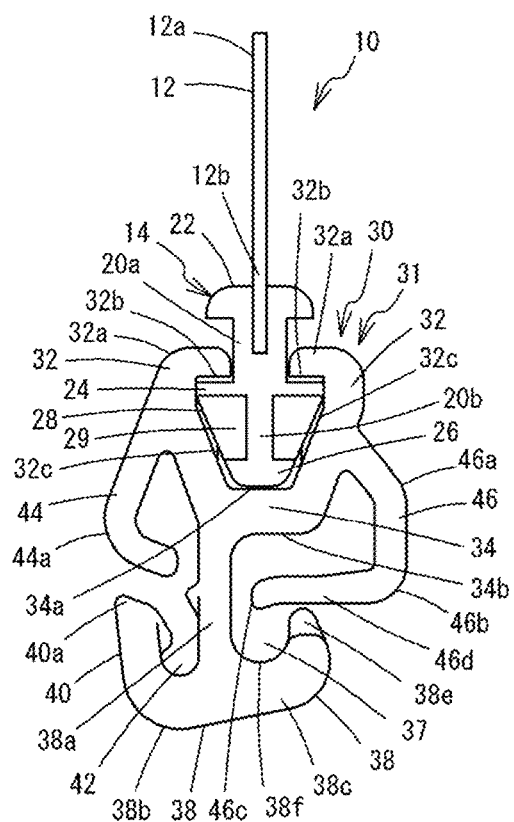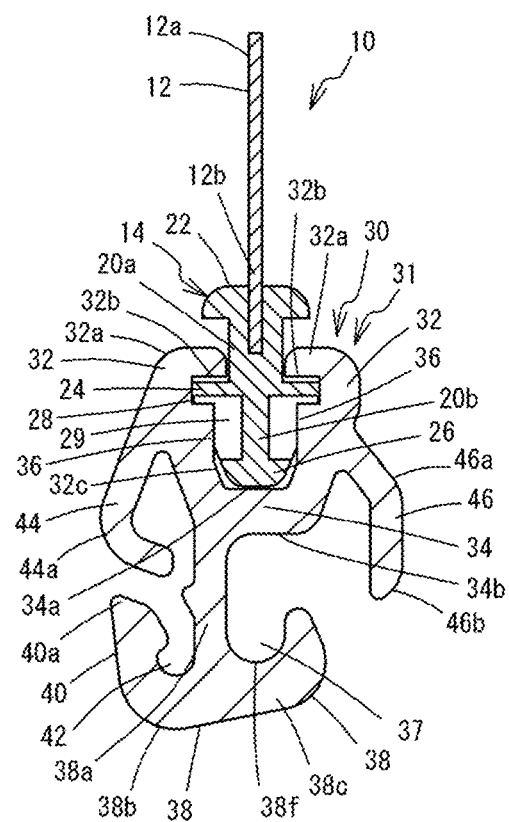

END MEMBER FOR FASTENING COVER MATERIAL

TECHNICAL FIELD

The present invention relates to a cover-material fastening end member for fixing an end edge portion of a cover material, which is intended to cover a surface of a chair, a seat or the like, at a predetermined location to stretch the cover material on a seat or the like.

BACKGROUND ART

Conventionally, in chairs used indoors, vehicle seats or the like, ones are often used, in which a cushion material or flexible pad is installed on a part thereof to be touched by a human body, such as a seat surface or a back rest, and then a surface thereof is covered with a cover material. Various structures are employed for covering and fixing such a cover material. In order to neatly fix a cover material while externally concealing an end edge portion thereof, a structure is known, in which a wire is arranged in a groove of a cushion material, a cover-material fastening end member is sewn along an end edge portion of a cover material, clips are engaged with the cover-material fastening end member at predetermined intervals, and then the clips are engaged with the wire in the cushion material, which is provided on a chair or the like, thereby fastening the cover material on the chair or the like while tensioning the cover material.

For example, as disclosed in Patent Document 1, the cover-material fastening end member is constituted of a tape member, which is a band-shaped member allowing a sheet material to be sewn thereon, and a clip locking member provided by integrally molding resin on one end edge portion of the tape member parallel to a longitudinal direction thereof and opposite to the sheet material. Accordingly, the cover-material fastening end member is formed in an elongated shape to have the same length as that of the tape member. The clip locking member has a cross-sectional shape perpendicular to the longitudinal direction formed in an arrow shape and is provided with joint portions provided at predetermined short intervals along the longitudinal direction and having a shape of a groove cut in a direction perpendicular to the longitudinal direction. Thus, by engaging a pair of leg portions of a clip to the cover-material fastening end member, the clip can be attached thereon without moving the clip in the longitudinal direction. Also, the clip can be attached at any positions along the longitudinal direction by changing a locking position thereof on the joint portions of the cover-material fastening end member. Then, a hook of the clip is engaged with a wire in a cushion material, thereby fastening a cover material on a surface of the cushion material.

In addition, a cover-material fastening end member as disclosed in Patent Document 2 has a configuration, in which a clip locking member provided on an end edge of a tape member is formed in a shape of an elongated column having an elliptical cross section, and attachment portions for a clip are formed on the clip locking member at predetermined intervals.

Also, a cover-material fastening end member as disclosed in Patent Document 3 has a configuration, in which instead of the wire as described above, an elongated holding member having a C-shaped cross section is attached in a chair cushion and the cover-material fastening end member is fixed to the holding member. On a clip locking member of the cover-material fastening end member, a flange portion is provided to be parallel to a longitudinal direction thereof and perpendicular to a width direction thereof, and also a plurality of engaging protrusions, which are configured to be fitted and engaged in the holding member, are provided at predetermined intervals on a side of the flange portion opposite to a sheet material.

PRIOR ART DOCUMENT

Patent Document

Patent Document 1: WO2013/069114
Patent Document 2: WO2015/068311
Patent Document 3: Japanese Patent Application Publication No. 2009-148407A

SUMMARY OF INVENTION

Problems to be Solved by Invention

The cover-material fastening end member disclosed in Patent Document 1 of the background arts is configured to be easily bent in two directions perpendicular to the longitudinal direction, since the cross-sectional shape thereof is formed in an arrow shape and also a plurality of joint portions, which have a shape of a groove cut in a direction perpendicular to the longitudinal direction, are provided along the longitudinal direction. Therefore, if clips are locked on the wire in the cushion material while tensioning the cover material in order to attach the cover material thereon, a tension of the cover material causes a part of the cover-material fastening end member, which is located between clips, to be bent in a tension direction. Accordingly, there is a problem that wrinkles are likely to occur on the cover material. In contrast, if a cross-sectional area of the clip locking member is increased in order to prevent bending of the cover-material fastening end member, there is a conflicting problem that the cover-material fastening end member cannot be neatly bent to conform to a shape of a curved surface of a seat.

In the case of the cover-material fastening end member disclosed in Patent Document 1, locations at which clips are attached are fixed. Accordingly, it is impossible to change the locations of the clips in order to attach the clips in accordance with a seat shape. Therefore, the cover material cannot be attached in an optimal state. In addition, as described above, in order to prevent a part between the clips from being easily bent due to a tension of the cover material upon attaching thereof, a cross-sectional area of the circular column-shaped clip locking member has to be increased. However, if only the cross-sectional area of the clip engaging member is increased, it is difficult to conform the clip engaging member to a curved shape of a seat.

Also, the cover-material fastening end member disclosed in Patent Document 3 is configured to be attached by sequentially pushing the engaging protrusions into the holding member while bending the clip locking member. Accordingly, the clip locking member has a lower rigidity. Therefore, in order to attach a cover material without wrinkles, the intervals between the engaging protrusions have to be narrower. As a result, the number of the engaging protrusions is increased, thereby increasing man-hours and costs for attaching. In contrast, if the intervals between the engaging protrusions are widened in order to effectively attach the cover material, there is a problem that wrinkles occur on the cover material due to bending of the clip locking member.

The present invention has been made keeping in mind the problems of the above background arts, and an object thereof is to provide a cover-material fastening end member, which has a simple structure and a high rigidity in a desired direction, neatly follows a curved surface, such as a seat shape, and also makes stretching of the cover material easy.

Means for Solving Problems

The present invention is a cover-material fastening end member configured to be attached on an end edge of a cover material and also to allow a locking clip to be locked thereon in order to attach and fix the cover material in such a manner that a surface of a seat is covered with the cover material, the cover-material fastening end member including: a band-shaped member fixed on an end edge portion of the cover material; and a locking member integrally provided along a longitudinal direction on one end edge portion of the band-shaped member opposite to the other end edge portion thereof, on which the cover material is fixed, wherein the locking member is formed such that a width thereof in a direction perpendicular to a surface of the band-shaped member is wider than a width of the band-shaped member; wherein the locking member includes: a center plate-shaped portion formed along the longitudinal direction on the one end edge portion of the band-shaped member; a flange portion provided along at least one end edge of the center plate-shaped portion along a longitudinal direction thereof, wherein the flange portion has a surface extending along a longitudinal direction of the end edge portion of the band-shaped member and perpendicular to a surface of the center plate-shaped portion; and a plurality of rib portions each having a surface intersecting with the center plate-shaped portion and the flange portion, wherein the rib portions are provided on the center plate-shaped portion along the longitudinal direction of the center plate-shaped portion at predetermined intervals.

A cross-sectional shape of the center plate-shaped portion in a plane perpendicular to the longitudinal direction may be configured such that the flange portion and the rib portions are axisymmetric about the center plate-shaped portion. The flange portion may include a middle flange portion symmetrically protruding from a location containing the centroid of the cross-sectional shape of the center plate-shaped portion.

On an end edge portion of the center plate-shaped portion opposite to the band-shaped member, an end edge flange portion may be provided along the longitudinal direction to be parallel to the middle flange portion.

A width of the end edge flange provided on the end edge of the center plate-shaped portion as measured between both side edge portions thereof along the longitudinal direction may be narrower than a width of the middle flange portion as measured between both side edge portions thereof at the centroid of the center plate-shaped portion. The end edge flange portions may be formed on both side edge portions, along the longitudinal direction, of the center plate-shaped portion.

The center plate-shaped portion may be formed such that a thickness of a part thereof on a side, on which the band-shaped member is provided, may be thicker than a thickness of a part thereof near to an end edge portion thereof opposite to the band-shaped member.

The rib portions may be formed such that a dimension thereof in the direction perpendicular to the surface of the band-shaped member is gradually decreased toward an end edge thereof opposite to a side, on which the band-shaped member is provided. Also, a width of the rib portions in the longitudinal direction of the band-shaped member may be smaller than a width between the adjacent rib portions.

The flange portion may be configured such that a dimension thereof in the direction perpendicular to the surface of the center plate-shaped portion is smaller than a dimension thereof in an upward and downward direction perpendicular to the longitudinal direction of the center plate-shaped portion.

Advantageous Effects of Invention

According to the cover-material fastening end member of the present invention, a second moment of inertia of a cross section thereof, which is taken along a direction perpendicular to the longitudinal direction, with respect to a predetermined direction, is set as large as possible. Even when a cover material is attached on a cushion material, it is not easy for the cover-material fastening end member to be bent due to a tension of the cover material, thereby preventing occurrence of wrinkles on the cover material. In addition, the cover-material fastening end member can be bent to some extent in other directions to conform to a shape of the cushion material and also has a certain rigidity. Accordingly, the cover-material fastening end member can attach the cover material in a neatly stretched state and also maintain the attached state for a long time. Also, the attaching operation can be easily performed.

BRIEF DESCRIPTION OF DRAWINGS

FIGS. 6A and 6B are respectively a right side view of the locking clip attached to the cover-material fastening end member according to the present embodiment and a sectional view taken along a line B-B in FIG. 5A.

EMBODIMENTS OF INVENTION

Figure 7:
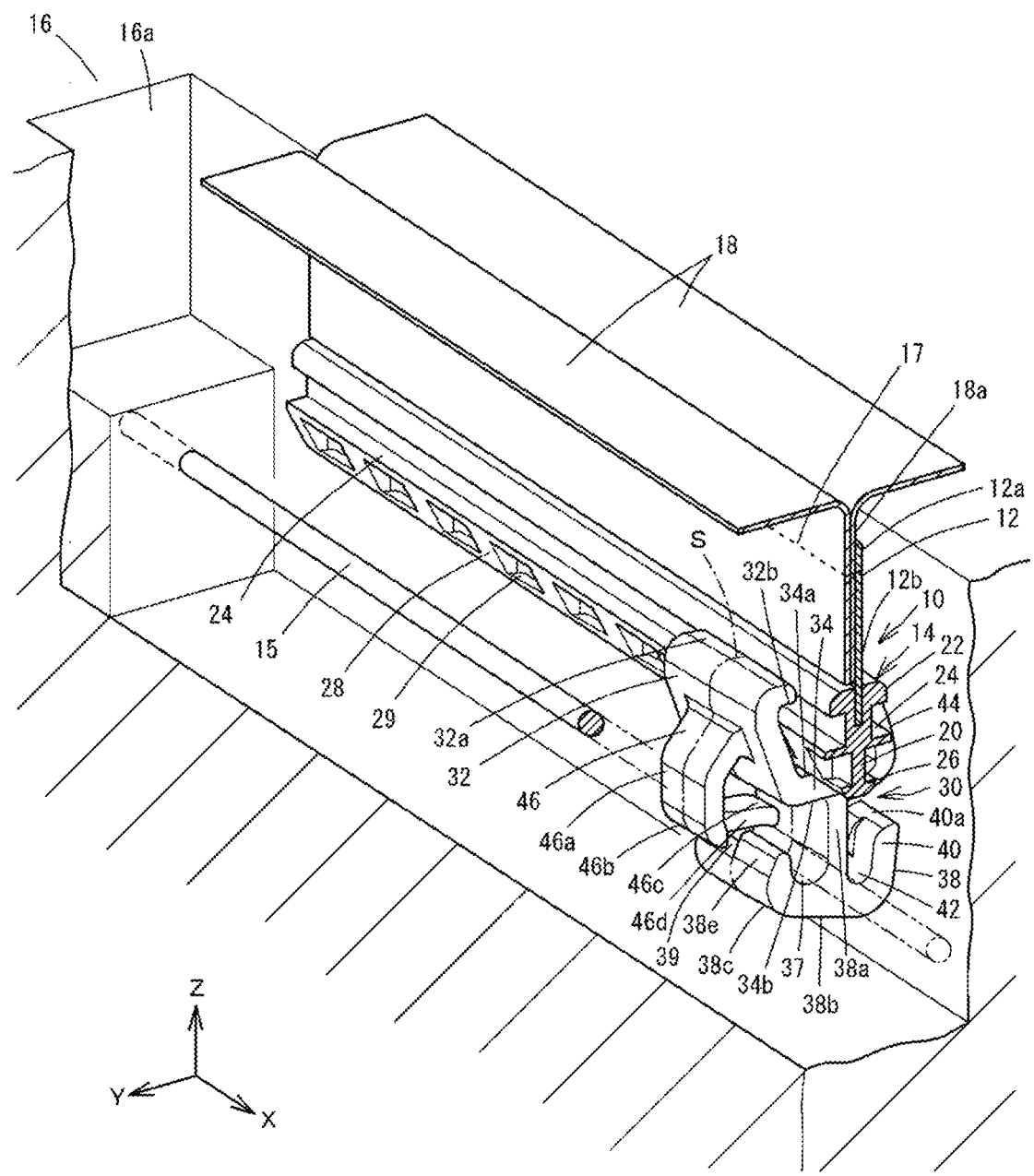
FIG. 7 is a partially broken perspective view showing a use state of the cover-material fastening end member according to the present embodiment.
Figure 8:
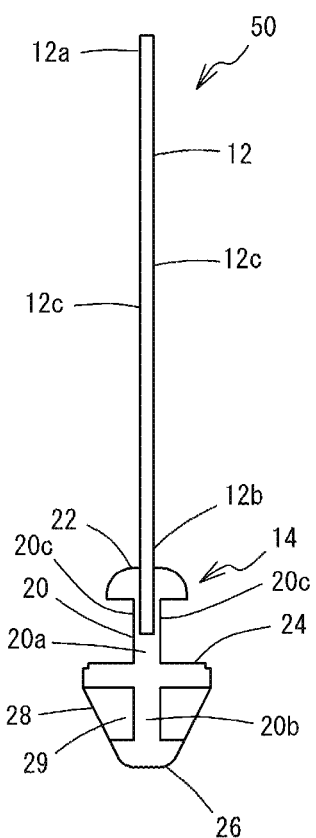
FIG. 8 is a right side view of a cover-material fastening end member according to a second embodiment of the present invention.
Figure 9A:
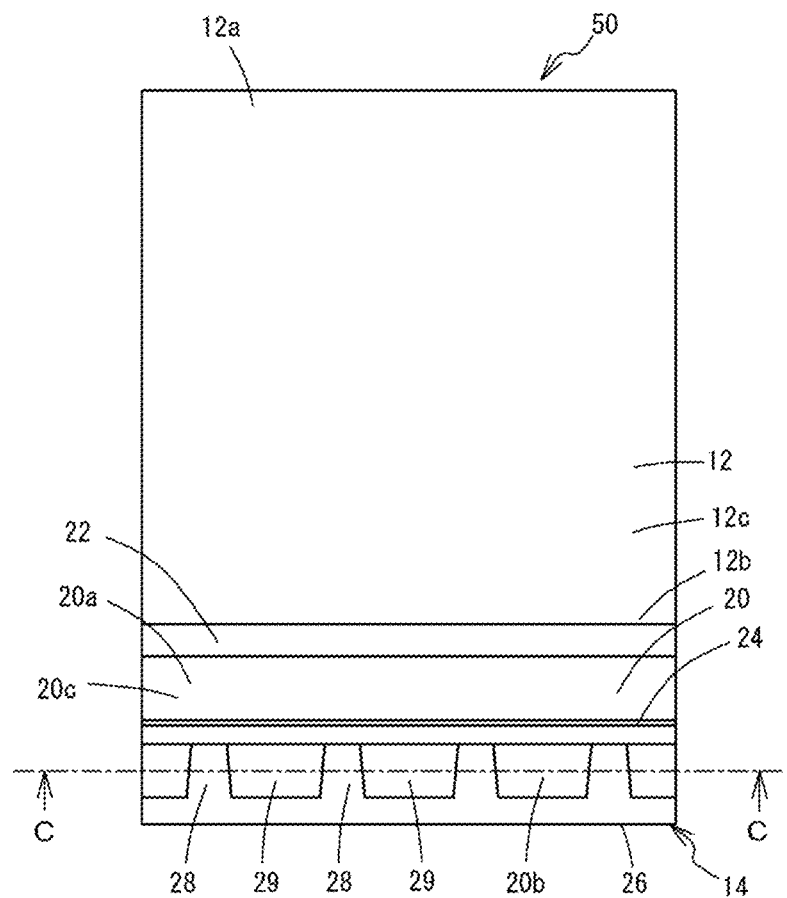
FIGS. 9A and 9B are respectively a front view and a bottom view showing a part of a continuous cover-material fastening end member according to the second embodiment.
Figure 9B:
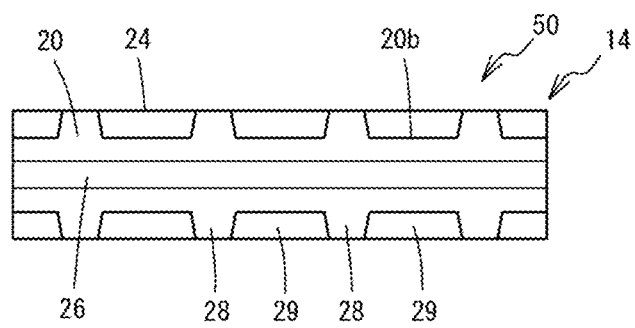
Figure 10:
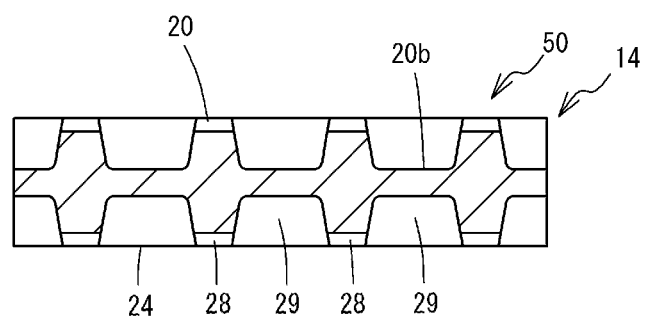
FIG. 10 is a sectional view taken along a line C-C in FIG. 9A.
Figure 11:
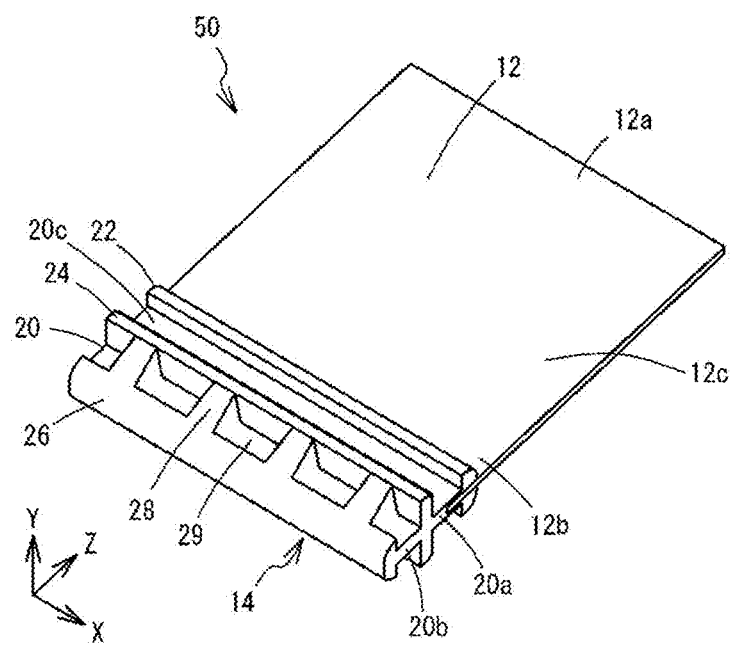
FIG. 11 is a perspective view showing a part of the continuous cover-material fastening end member according to the second embodiment.
Figure 12:
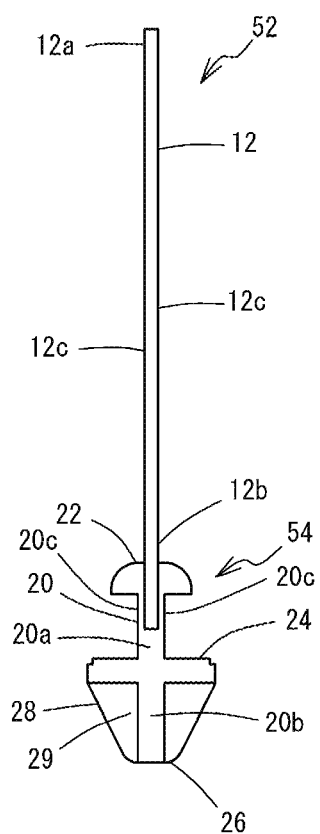
FIG. 12 is a right side view of a cover-material fastening end member according to a third embodiment of the present invention.
Figure 13A:
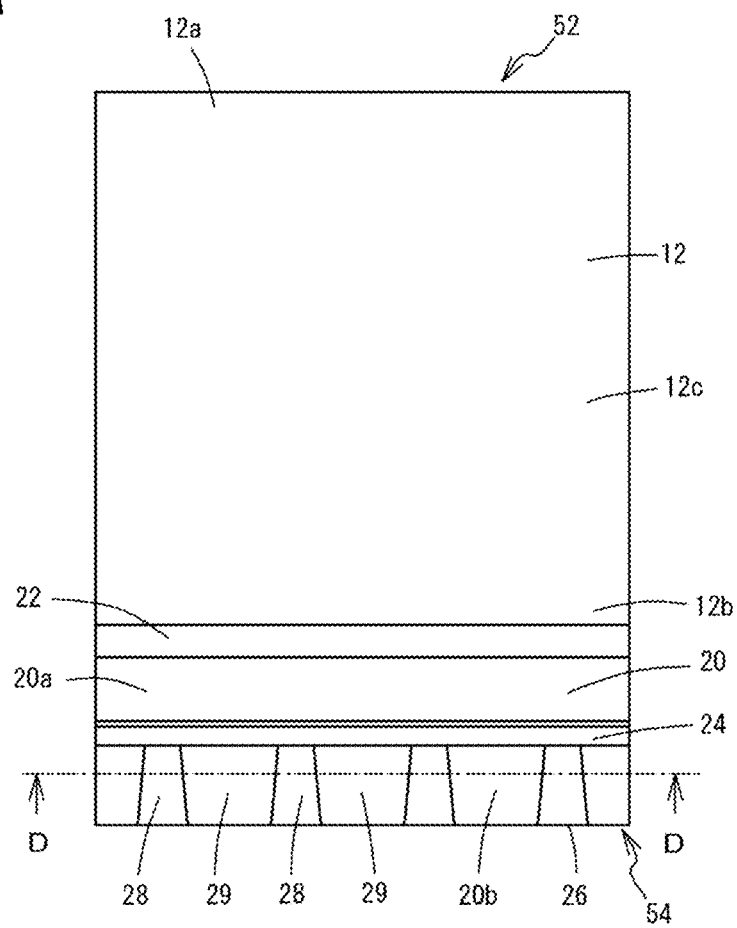
FIGS. 13A and 13B are respectively a front view and a bottom view showing a part of a continuous cover-material fastening end member according to the third embodiment.
Figure 13B:
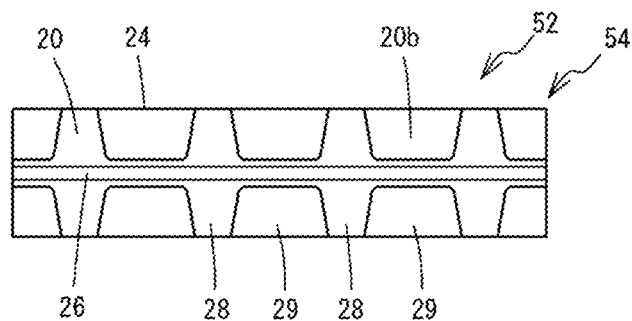
Figure 14:
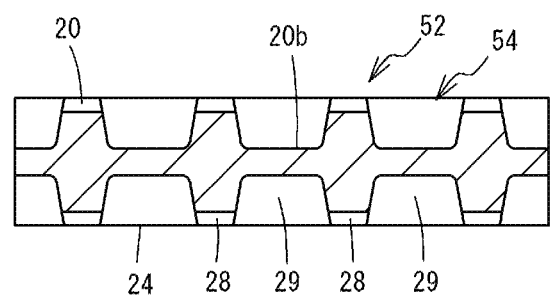
FIG. 14 is a sectional view taken along a line D-D in FIG. 13A.
Figure 15:
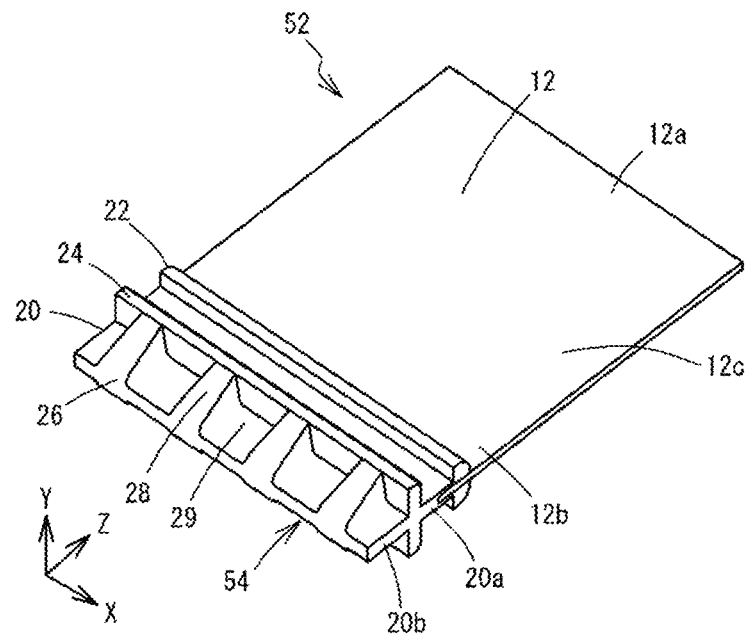
FIG. 15 is a perspective view showing a part of the continuous cover-material fastening end member according to the third embodiment.
Figure 16:
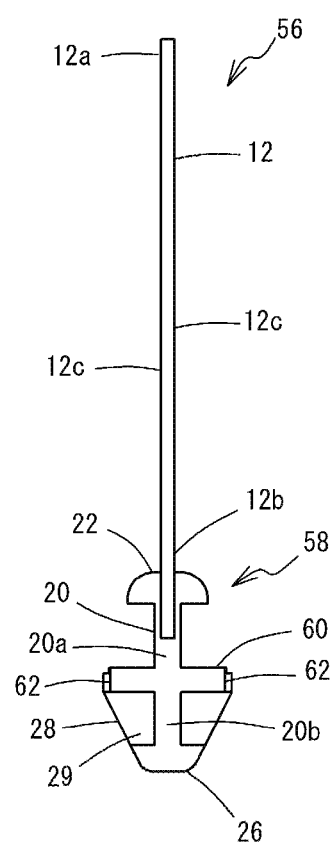
FIG. 16 is a right side view of a cover-material fastening end member according to a fourth embodiment of the present invention.
Figure 17A:
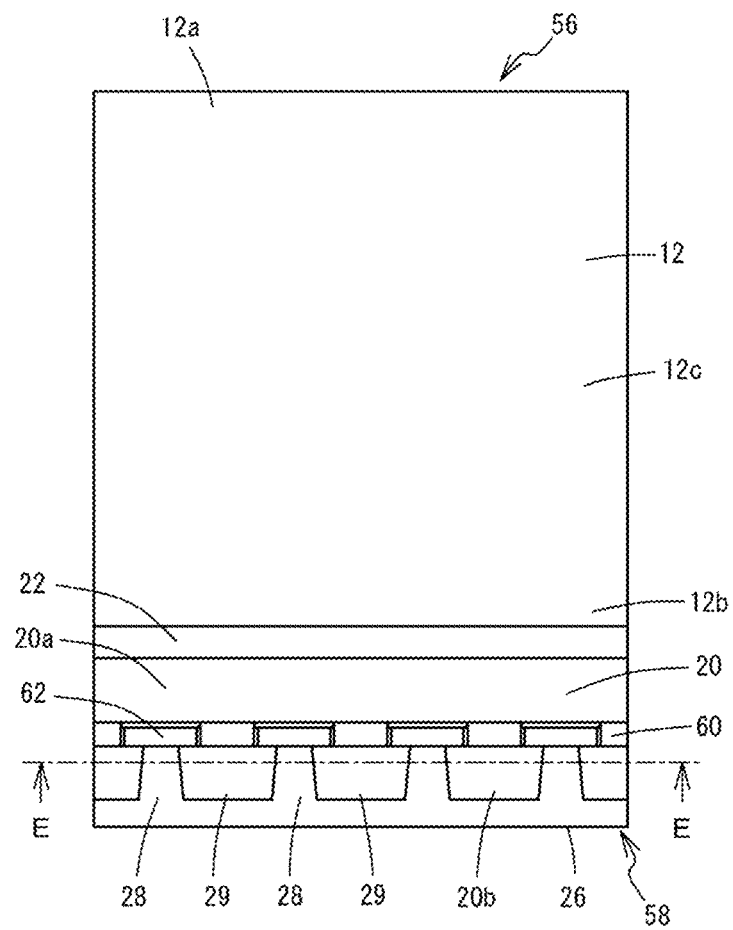
FIGS. 17A and 17B are respectively a front view and a bottom view showing a part of a continuous cover-material fastening end member according to the fourth embodiment.
Figure 17B:
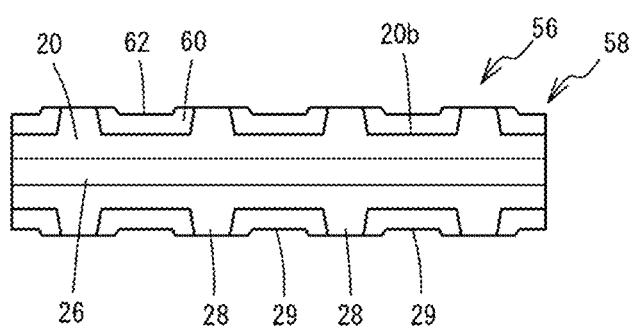
Figure 18:
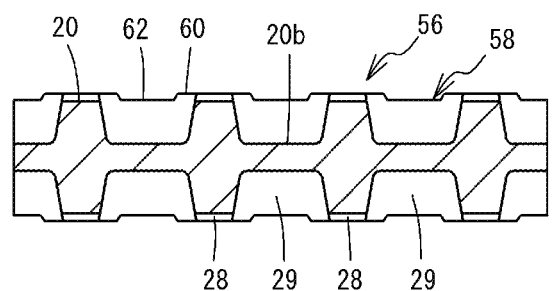
FIG. 18 is a sectional view taken along a line E-E in FIG. 17A.
Figure 19:
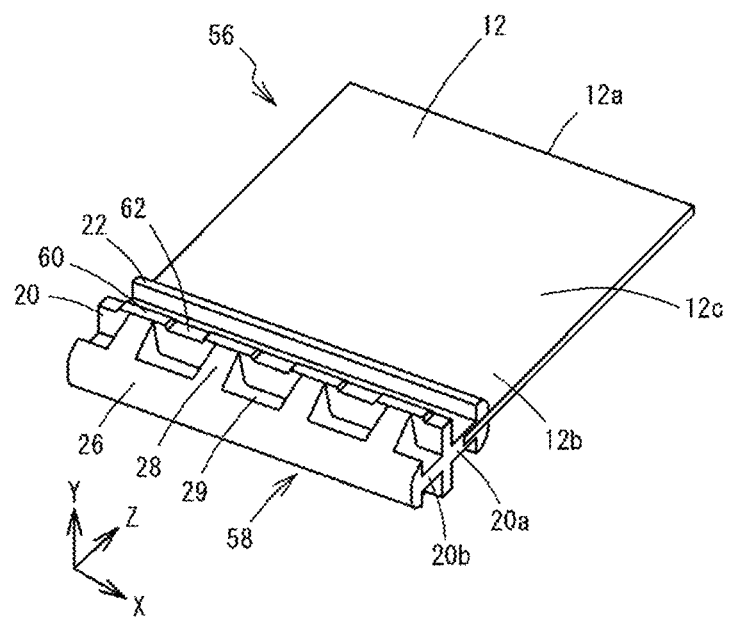
FIG. 19 is a perspective view showing a part of the continuous cover-material fastening end member according to the fourth embodiment.
Figure 20:
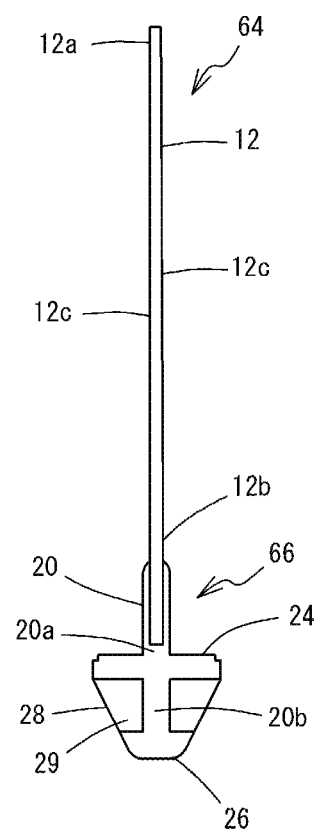
FIG. 20 is a right side view of a cover-material fastening end member according to a fifth embodiment of the present invention.
Figure 21A:
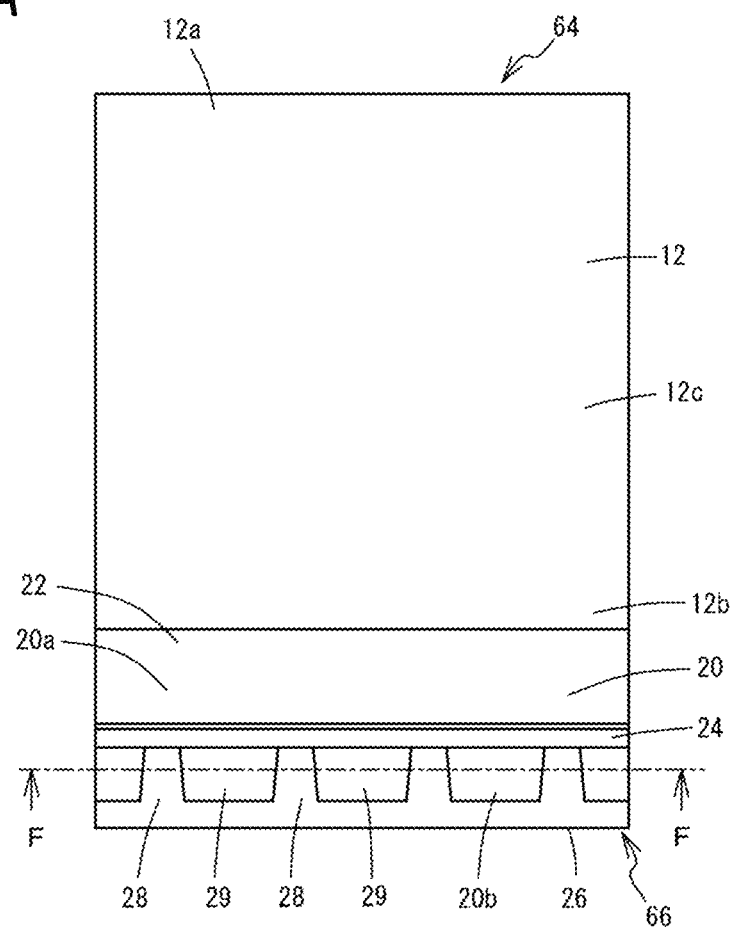
FIGS. 21A and 21B are respectively a front view and a bottom view showing a part of a continuous cover-material fastening end member according to the fifth embodiment.
Figure 21B:
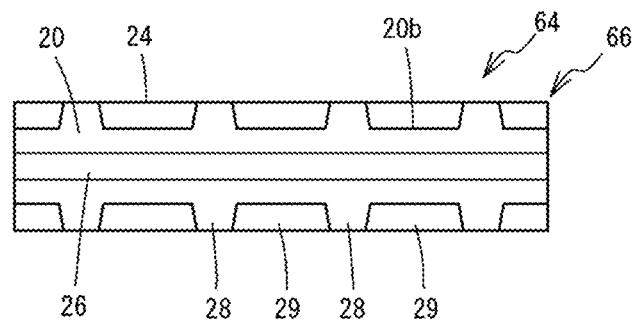
Figure 22:
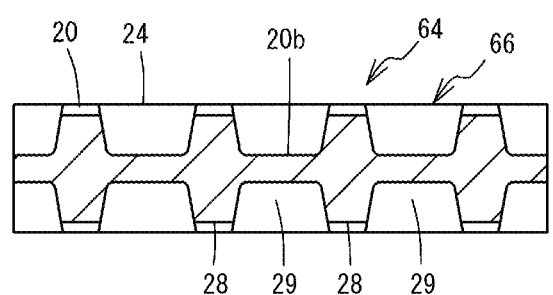
FIG. 22 is a sectional view taken along a line F-F in FIG. 21A.
Figure 23:
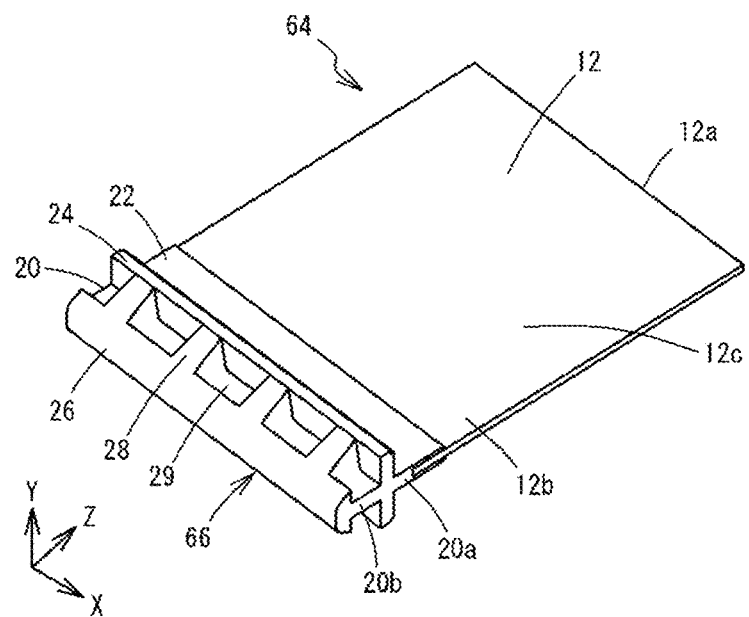
FIG. 23 is a perspective view showing a part of the continuous cover-material fastening end member according to the fifth embodiment.
Figure 24:
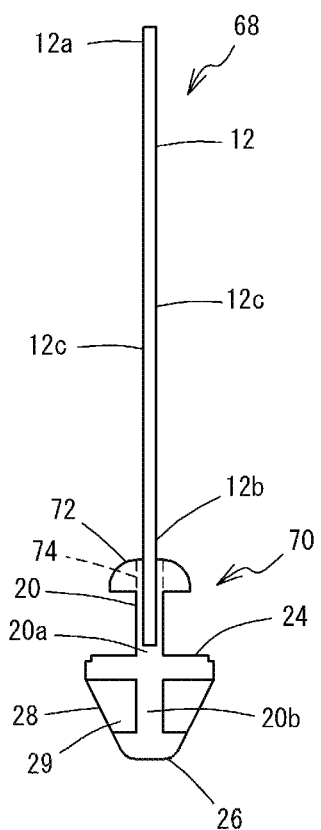
FIG. 24 is a right side view of a cover-material fastening end member according to a sixth embodiment of the present invention.
Figure 25A:
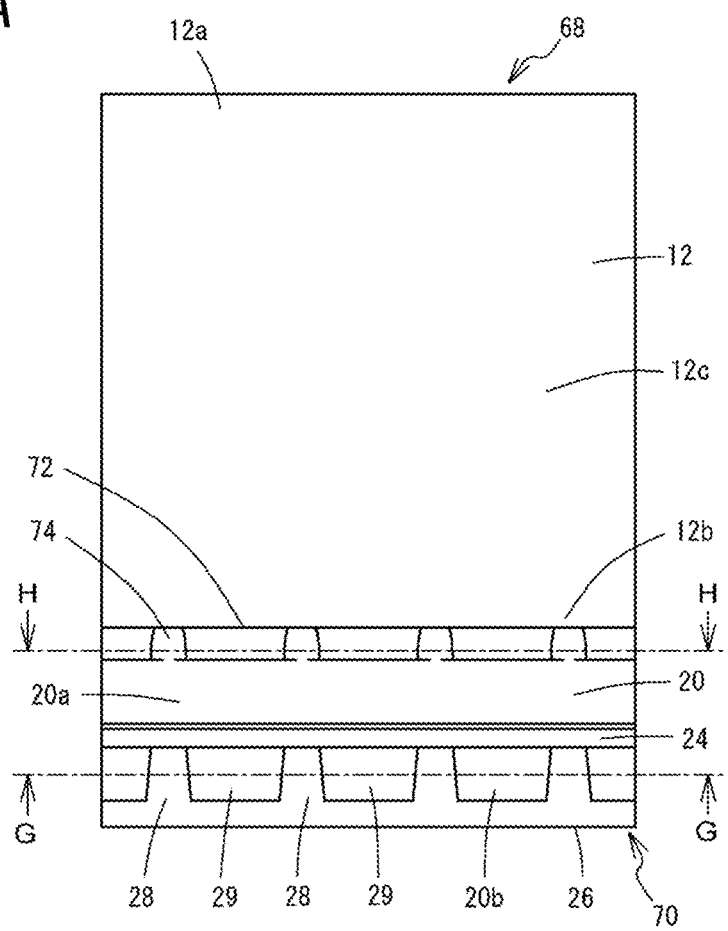
FIGS. 25A and 25B are respectively a front view and a bottom view showing a part of a continuous cover-material fastening end member according to the sixth embodiment.
Figure 25B:
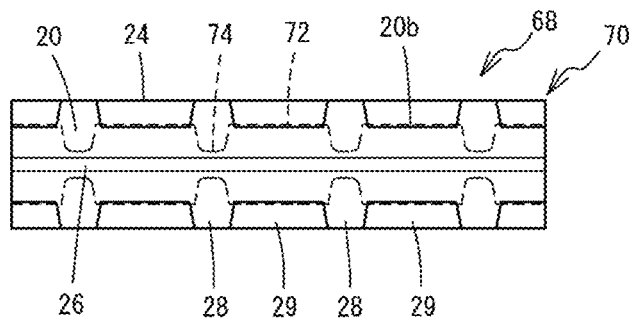
Figure 26A:
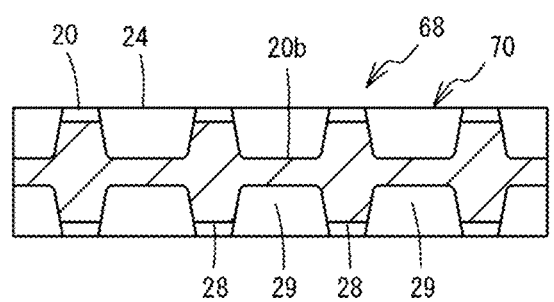
FIGS. 26A and 26B are respectively a sectional view taken along a line G-G in FIG. 25A and a sectional view taken along a line H-H in FIG. 25B.
Figure 26B:
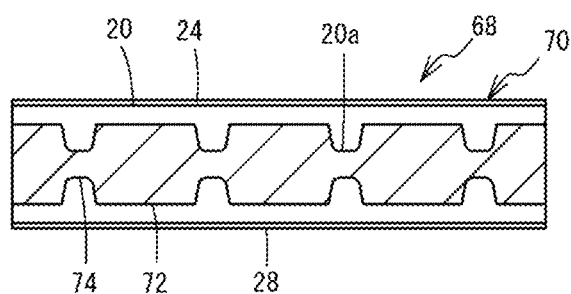
Figure 27:
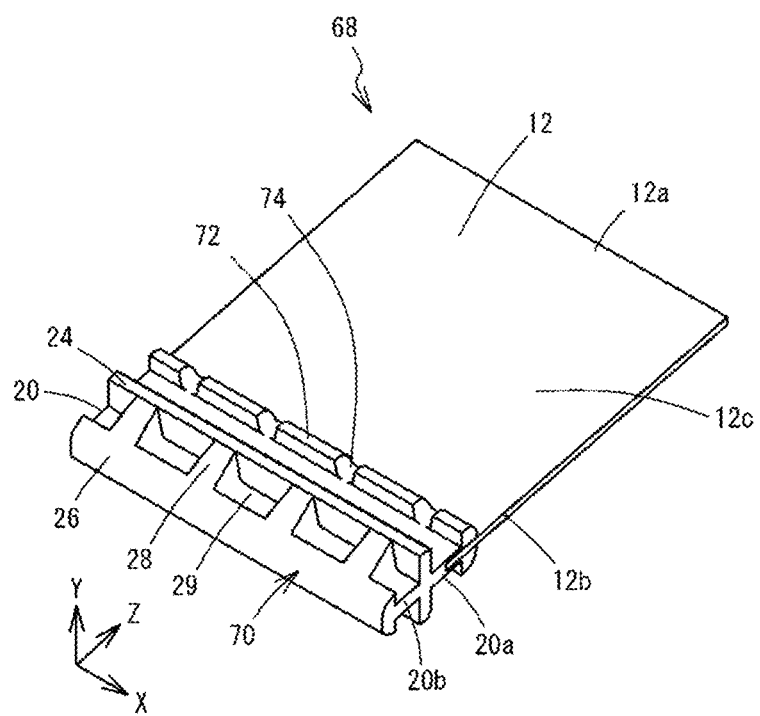
FIG. 27 is a perspective view showing a part of the continuous cover-material fastening end member according to the sixth embodiment.
Figure 28:
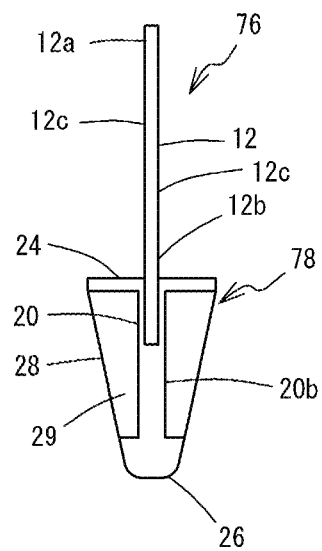
FIG. 28 is a right side view of a cover-material fastening end member according to a seventh embodiment of the present invention.
Figure 29A:
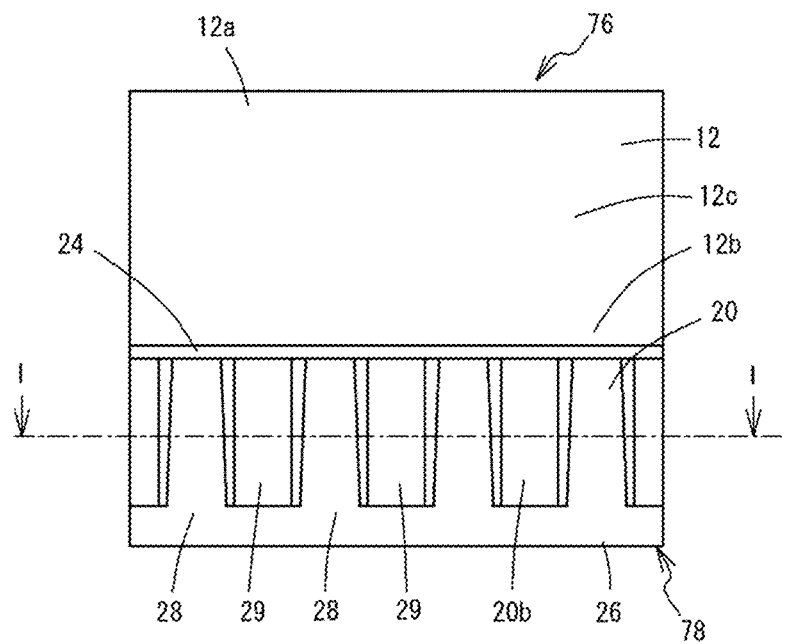
FIGS. 29A and 29B are respectively a front view and a bottom view showing a part of a continuous cover-material fastening end member according to the seventh embodiment.
Figure 29B:
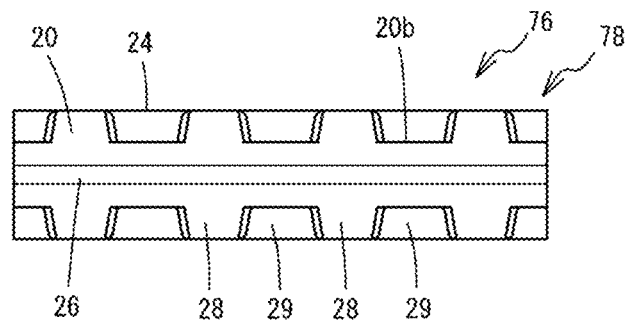
Figure 30:
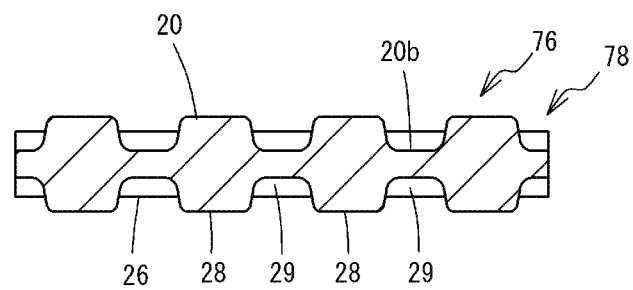
FIG. 30 is a sectional view taken along a line I-I in FIG. 29A.
Figure 31:
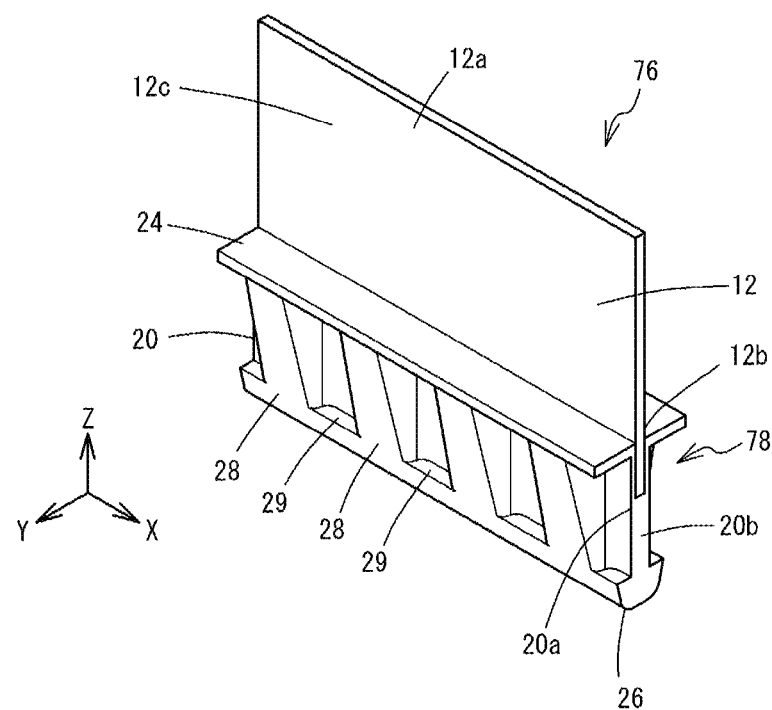
FIG. 31 is a perspective view showing a part of the continuous cover-material fastening end member according to the seventh embodiment.

Hereinafter, embodiments of a cover-material fastening end member will be described with reference to the accompanying drawings. As shown in FIGS. 1 to 7, a cover-material fastening end member 10 according to a first embodiment of the present invention is constituted of an elongated band-shaped member 12, such as cloth, and a locking member 14 provided along a longitudinal direction of the band-shaped member 12. The locking member 14 is molded from a thermoplastic resin, such as polypropylene, polyethylene, polyvinyl chloride, polystyrene or polybutylene terephthalate, and is integrally insert-molded along the longitudinal direction on one end edge portion 12b of the band-shaped member 12 opposite to the other end edge portion 12a thereof, on which a cover material 18 is to be fixed. The locking member 14 is configured to allow a fixing clip 30, as described below, a hog ring (not shown), which is obtained by shaping a metal wire material into a ring shape, and the like to be attached thereto. As shown in FIG. 7, the cover-material fastening end member 10 is used to stretch a cover material 18 for a vehicle seat at a predetermined location on a surface of a cushion material 16 for the seat. The cover material 18 is a leather, cloth or synthetic leather sheet or the like for covering the surface of the cushion material 16, and the band-shaped member 12 of the cover-material fastening end member 10 is sewn and fixed on an end edge portion 18a thereof to be inserted into a groove 16a of the cushion material 16 by a sewing thread.

The cushion material 16 is a synthetic resin foam material, such as polyurethane, molded into a shape of the seat and has a groove 16a formed therein for fixing the cover material on the cushion material 16 and a wire 15 installed in the groove 16a. The wire 15 is a metal wire material and is incorporated in the cushion material 16 by insert-molding upon molding of the cushion material 16. Therefore, the wire 15 is firmly fixed so as not to be displaced.

Figure 1:
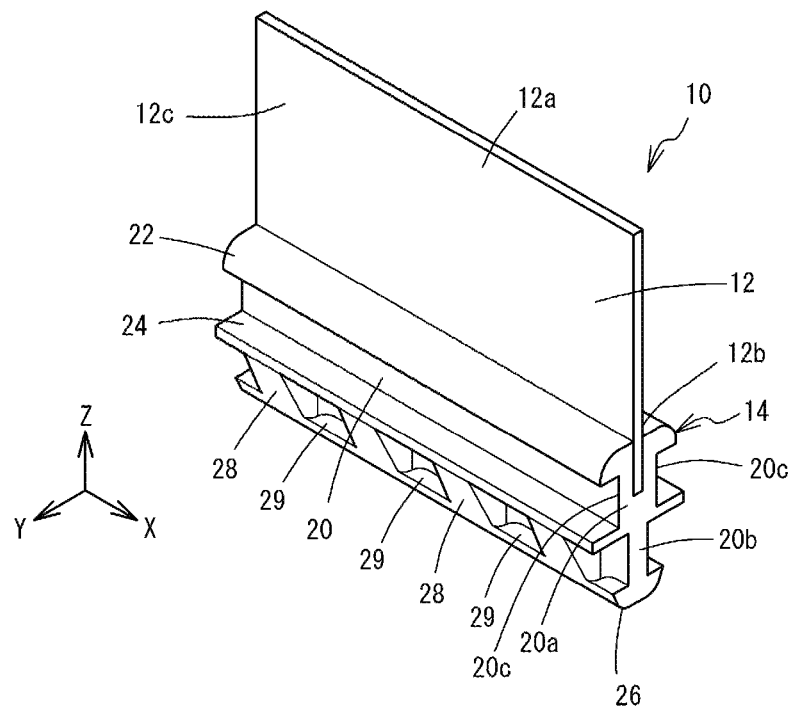
FIG. 1 is a perspective view showing a part of a continuous cover-material fastening end member according to one embodiment of the present invention.

With regard to the description of the cover-material fastening end member 10 of the present invention, directions will be described with reference to XYZ axis directions perpendicular to each other as shown in FIG. 1 as well as other figures. The X-axis direction corresponds to a longitudinal direction of the cover-material fastening end member 10 and also corresponds to a direction along which an end edge of the cover material 18 extends. An insertion direction in which the cover-material fastening end member 10 is inserted into the groove 16a of the cushion material 16 is the Z-axis direction perpendicular to the X-axis direction and is also referred to as an upward and downward direction. Also, a direction perpendicular to the X-axis direction, which is the longitudinal direction of the cover-material fastening end member 10, and also to the Z-axis direction, which is the upward and downward direction, is the Y-axis direction and is also referred to as a right and left direction. A direction parallel to the right and left direction is also referred to as a lateral direction.

The band-shaped member 12 of the cover-material fastening end member 10 according to the present embodiment is a band-shaped elongated member extending in the X-axis direction while having a constant width along the Z-axis direction and is formed by a woven fabric, a non-woven fabric, a knitted fabric, a synthetic leather, a laminate of other synthetic leather and fabric, or the like having the same strength as the cover material 18. A material constructing the band-shaped member 12 can be selected from suitable materials, such as nylon, polyester or acrylic. Meanwhile, the band-shaped member 12 may be a member separate from the locking member 14 or may be integrally formed with the locking member 14 by resin.

The locking member 14, which is integrally provided along the one end edge portion 12b of the band-shaped member 12, is provided along the longitudinal direction of the band-shaped member 12 by insert-molding a thermoplastic resin to sandwich the one end edge portion 12b of the band-shaped member 12. Thus, the locking member 14 is formed to have the same length as that of the band-shaped member 12.

The locking member 14 has a center plate-shaped portion 20 for holding the one end edge portion 12b of the band-shaped member 12 along the longitudinal direction. The center plate-shaped portion 20 has surfaces parallel to surfaces of the band-shaped member 12 and is provided to be elongated in the X-axis direction while having a constant width. The center plate-shaped portion 20 is provided such that a width thereof in the Y-axis direction, which is a direction perpendicular to a surface 12c of the band-shaped member 12, is greater than that of the band-shaped member 12, thereby sandwiching the band-shaped member 12. On a holding portion 20a of the center plate-shaped portion 20, which is one end edge of the center plate-shaped portion 20 along the longitudinal direction and holds the band-shaped member 12, a base end-side end edge flange portion 22 having a surface extending along the X-axis direction and perpendicular to the surfaces of the center plate-shaped portion 20, is integrally formed therewith. Both side edge corner portions of the end edge flange portion 22 along the X-axis direction, which face the band-shaped member 12, are chamfered to have an outwardly curved shape. Also, on a middle portion of the center plate-shaped portion 20 in the Z-axis direction, a middle flange portion 24, which has a surface extending along the X-axis direction and perpendicular to the surfaces of the center plate-shaped portion 20 and has a width in the Y-axis direction wider than that of the end edge flange portion 22, is integrally formed therewith. The middle flange portion 24 is formed to contain the centroid of the center plate-shaped portion 20 in the Z-axis direction. A low end portion 20b, which corresponds to a lower end side of the center plate-shaped portion 20 opposite to the holding portion 20a across the middle flange portion 24, is formed such that a thickness thereof in the Y-axis direction is thinner than that of the holding portion 20a. Also, on an end edge of the low end portion 20b, a lower end-side end edge flange portion 26 along the X-axis direction, which is the longitudinal direction, is integrally formed therewith. Lower end sides of both side edge corner portions of the end edge flange portion 26 along the X-axis direction are chamfered to have an outwardly curved shape. The end edge flange portions 22, 26 are respectively formed on both end edges of the center plate-shaped portion 20 to extend parallel to the X-axis direction, and widths thereof in the Y-axis direction are formed such that a width of the lower end-side end edge flange portion 26 is slightly narrower than that of the base end-side end edge flange portion 22. Also, the widths of the end edge flange portions 22, 26 as measured between both side edge portions in the Y-axis direction are formed to be narrower than a width of the middle flange portion 24 as measured between both side edge portions in the Y-axis direction. A thickness of each of the end edge flange portions 22, 26 in the Z-axis direction is formed to be thicker than that of the middle flange portion 24. Each of the flange portions 22, 24, 26 refers to a portion, in which a dimension thereof in the Y-axis direction perpendicular to the surface 20c of the center plate-shaped portion 20 is smaller than a dimension thereof in the upward and downward direction, which is the Z-axis direction perpendicular to the longitudinal direction of the center plate-shaped portion 20.

Figure 2:
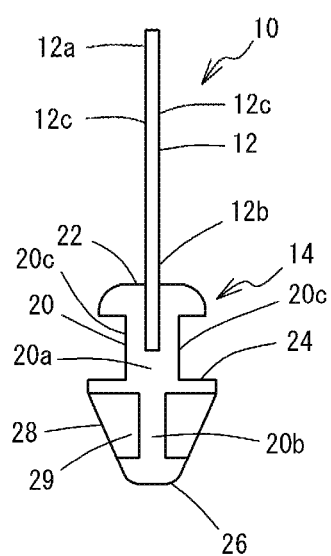
FIG. 2 is a right side view of the cover-material fastening end member according to the present embodiment.
Figure 3A:
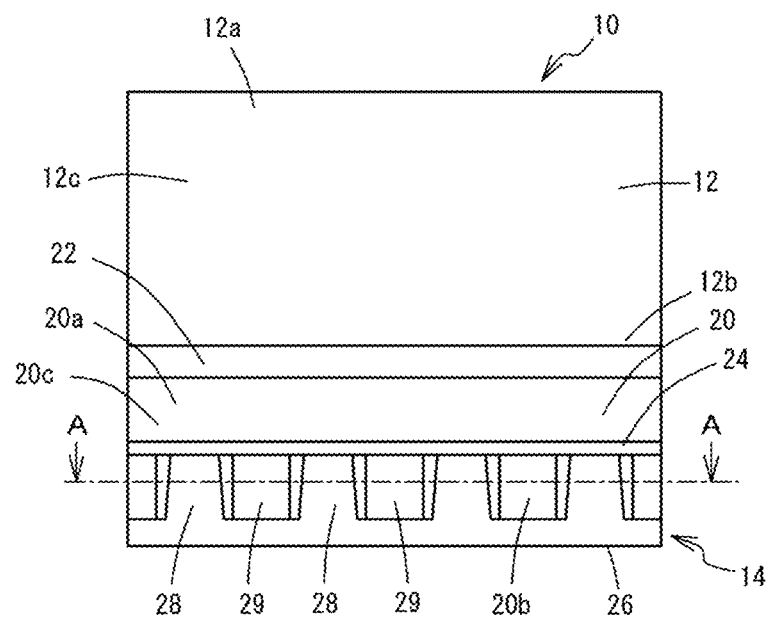
FIGS. 3A and 3B are respectively a front view and a bottom view showing a part of the continuous cover-material fastening end member according to the present embodiment.
Figure 3B:
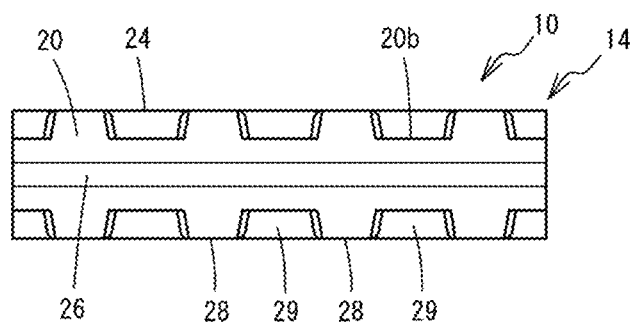
Figure 4:
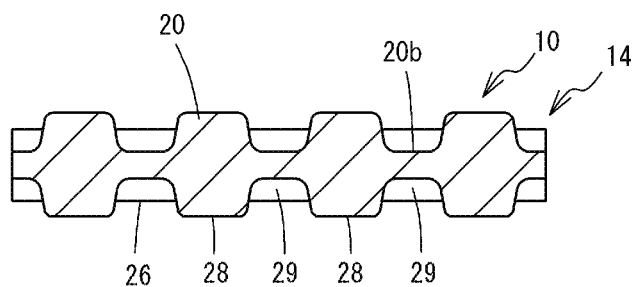
FIG. 4 is a sectional view taken along a line A-A in FIG. 3A.

As shown in FIG. 2, a cross-sectional shape of the cover-material fastening end member 10 in a plane perpendicular to the X-axis direction, which is the longitudinal direction of the center plate-shaped portion 20, is configured such that the end flange portions 22, 26 and the middle flange portion 24 are axisymmetric about the center axis of the center plate-shaped portion 20 extending along the Z-axis direction, which is the upward and downward direction. Also, on both surfaces of the center plate-shaped portion 20, a plurality of rib portions 28 are formed to protrude from a surface of each of the center plate-shaped portion 20, the middle flange portion 24 and the lower end-side end edge flange portion 26 in the Y-axis direction perpendicular thereto and also to have constant intervals along the longitudinal direction of the center plate-shaped portion 20. As shown in FIG. 2 as well as other figures, the rib portions 28 are formed on both surfaces of the center plate-shaped portion 20 in such a manner that the rib portions 28 protrude to be connected to a lower surface, in the Z-axis direction, of the middle flange portion 24 and an upper surface, in the Z-axis direction, of the lower end-side end edge flange portion 26 and thus are integrally provided therewith. As shown in FIGS. 3A, 3B and 4, a width, in the X-axis direction, of each of the rib portions 28 is substantially the same as a width, in the X-axis direction, of each of locking recess portions 29, on which the rib portions 28 are not provided, and the rib portions 28 are formed at locations opposing each other on both surfaces of the center plate-shaped portion 20 at constant intervals along the X-axis direction of the locking member 14. A width of the rib portions 28 as measured between both surfaces in the Y-axis direction is formed to be linearly gradually decreased from the middle flange portion 24 toward the end edge flange portion 26, so that the rib portions 28 are formed in a shape of an inclined surface along the Z-axis direction on both sides of the center plate-shaped portion 20. Meanwhile, if the width, in the X-axis direction, of each of the rib portions 28 is smaller than the width, in the X-axis direction, of each of the locking recess portions 29, on which the rib portions 28 are not provided, bending in the Y-axis direction can be made easy.

The locking member 14 configured as described above is formed such that a second moment of inertia of a cross section thereof in a YZ plane is as large as possible. That is, bending moments exerted on the cover-material fastening end member 10 act on a XZ plane, which contains the X-axis and the Z axis, by a force in the Z-axis direction caused by a tension exerted on the cover material 18 and also on a XY plane, which contains the X axis and the Y axis, by a force in the Y-axis direction caused by bending the cushion material 16 to conform to a curved surface of the seat. Therefore, for the bending moment in the XZ plane, it is preferable to have a shape, of which a second moment of inertia taken from the center axis along the Y-axis direction in FIG. 2 becomes larger. Accordingly, the center plate-shaped portion 20 is formed to extend in the Z-axis direction, and the end edge flange portions 22, 26 are respectively formed on both ends of the center plate-shaped portion 20, which are located far away from the center, in the Y-axis direction, of the center plate-shaped portion 20, thereby obtaining an increased second moment of inertia. Also, since the rib portions 28 are provided at predetermined intervals, the second moment of inertia can be further increased. On the other hand, for the bending moment in the XY plane, it is preferable to have a shape, of which a second moment of inertia taken from the center axis along the Z-axis direction in FIG. 2 is suitably large. Accordingly, the middle flange portion 24 and the end edge portions 22, 26 extending in the Y-axis direction to be perpendicular to the center plate-shaped portion 20 are formed on the center plate-shaped portion 20 as the center, so that the second moment of inertia thereof can also have a suitable value.

Next, the fixing clip 30 configured to be locked on the cover-material fastening end member 10 according to the present embodiment will be described with reference to FIGS. 5A to 7. The fixing clip 30 is integrally molded by synthetic resin and has a pair of locking claws 32. The locking claws 32 are formed to oppose each other. Base ends of the locking claws 32 are integrally provided on both sides of a locking claw base portion 34 of the fixing clip 30. The locking claws 32 are formed to protrude from the locking claw base portion 34 upwardly in the Z-axis direction in FIGS. 6A, 6B and 7, in such a manner that a distance therebetween in the right and left direction becomes wider as they go upward. Distal end portions 32a of the locking claws 32 are bent inward in the Y-axis direction to face and approach each other. A locking portion 31 is formed by the locking claws 32 and the locking claw base portion 34.

The distal end portion 32a of each of the locking claws 32 has a locking surface 32b formed to oppose the locking claw base portion 34 in the Z-axis direction and also to be substantially parallel to an upper surface of the locking claw base end portion 34. Accordingly, a part of the cover-material fastening end member 10 from the middle flange portion 24 to the lower end-side flange portion 26 is received and locked in a space surrounded by the pair of locking claws 32 and the locking claw base portion 34.

Inner surfaces 32c of the pair of locking claws 32, which face each other, are provided with locking protrusions 36. The locking protrusions 36 are provided at locations on the locking claws 32, which are respectively located at the middle thereof in the X-axis direction intersecting with an opposing direction of the locking claws 32, in such a manner that the locking protrusions 36 protrude to face each other in the Y-axis direction and have a length ranging from the locking surface 32b of the respective locking claws 32 to a middle of the inner surface 32c thereof. A thickness of the locking protrusions 36 in the X-axis direction is substantially constant and also smaller than the width of the locking recess portions 39 of the locking member 14 in the X-axis direction. Accordingly, the locking protrusions 36 are provided to have a thickness, which is capable of being fitted into the locking recess portions 29 of the locking member 14 and locked on the rib portions 28 and also allows the locking protrusions 36 to be moved inside the locking recess portions 29 by a predetermined amount in the X-axis direction.

A lower surface 34b of the locking claw base portion 34 opposite to the upper surface 34a is provided with a hook 38. The hook 38 is provided to be continued from an end portion of one of the pair of locking claws 32, which is located on the lower surface 34b. The hook 38 has an extension portion 38a extending downward in the Z-axis direction to be substantially perpendicular to the lower surface 34b, and a claw-shaped portion 38c bent from a distal end of the extension portion 38a in the right direction in FIGS. 6A and 6B to be inclined toward the locking portion 31. The claw-shaped portion 38c is inclined upward toward the locking claw base portion 34. A distal end portion 38e of the claw-shaped portion 38c has a shape bent along a plane, which is substantially perpendicular to an inclined surface, which is a lower surface of the claw-shaped portion 38c, and also is formed to protrude toward the locking claw base portion 34 and to be slightly thinned toward a tip thereof. Therefore, a U-shaped groove portion 38f surrounded by the extension portion 38a, the claw-shaped portion 38c and the distal end portion 38e defines a wire holding space 37, through which the wire 15 is to be inserted.

A cross-sectional shape of the hook 38 in the X-axis direction is formed to have a constant width, and the claw shaped portion 38c of the hook 38 is formed in such a manner that about a half of a part thereof, which extends from the middle of the claw-shaped portion 38c in the protruding direction thereof to the distal end portion 38e, is cut out to a predetermine depth. Therefore, as shown in FIGS. 6A and 6B, the distal end portion 38e of the hook 38 is formed in such a manner that a half thereof in the X-axis direction with respect to a center line S has a width, which is about half that of the hook 38.

The distal end of the extension portion 38a of the hook 38 is provided with an operating portion 38b extending in a direction opposite to the extending direction of the claw-shaped portion 38c. The operating portion 38b is provided to be inclined downward toward an end portion thereof opposite to the claw-shaped portion 38c, and the downward inclined end portion is provided with a jig receiving portion 40 for receiving a jig (not shown).

The jig receiving portion 40 extends from a distal end portion of the operating portion 38b toward the locking claws 32 to be substantially parallel to the extension portion 38a with a predetermined space interposed therebetween, and a distal end portion 40a thereof reaches the vicinity of the middle of the extension portion 38a in a length direction thereof and is positioned laterally from the extension portion 38a. The distal end portion 40a of the jig receiving portion 40 has an inclined surface formed to be oriented upward as it goes away from the extension portion 38a. A U-shaped groove portion surrounded by the extension portion 38a, the operating portion 38b and the jig receiving portion 40 defines a jig holding space 42 in which the jig (not shown) is to be inserted.

Among the pair of locking claws 32, a locking claw 32 on a side, on which the jig receiving portion 40 is formed, is provided with a jig guide piece 44 integrally formed with the locking claw 32. The jig guide piece 44 is provided in the vicinity of a corner portion of the locking claw 32, at which the distal end portion 32a is bent, and extends to be inclined in a direction away from the locking claws 32 as it goes from a side surface of the locking claw 32 downwardly in the Z-axis direction. Also, the jig guide piece 44 has a bent portion 44a provided in the vicinity of a lateral side of the lower surface 34b of the locking claw base portion 34. Thus, the jig guide piece 44 is bent toward the extension portion 38a of the hook 38 at the bent portion 44a and then reaches the vicinity of the middle of the extension portion 38a. A distal end portion of the bent jig guide piece 44 reaches a location near to the extension portion 38a beyond an extension line of the distal end portion 40a of the jig receiving portion 40 and thus is positioned at a predetermined distance from the extension portion 38a.

Among the pair of locking claws 32, a locking claw 32 opposing the distal end portion 38e of the hook 38 is provided with a wire guide piece 46 integrally formed with the locking claw 32. The wire guide piece 46 is provided in the vicinity of the middle of the locking claw 32 in the protruding direction thereof and extends in an inclined direction extending downward as it goes away from the locking claw 32. The wire guide piece 46 has a first bent portion 46a provided in the vicinity of a lateral side of the lower surface 34b of the locking claw base portion 34. Thus, the wire guide piece 46 is bent at the first bent portion 46a and then extends downward in the Z-axis direction to be parallel to the extension portion 38a of the hook 38. Also, the wire guide piece 46 has a second bent portion 46b provided at a location near to the middle of the extension portion 38a of the hook 38 and thus is bent at the second bent portion 46b at an angle of about 90°. A distal end portion 46c of the bent wire guide piece 46 extends toward the extension portion 38a of the hook 38 and thus reaches the vicinity of the extension portion 38a.

Figure 5A:
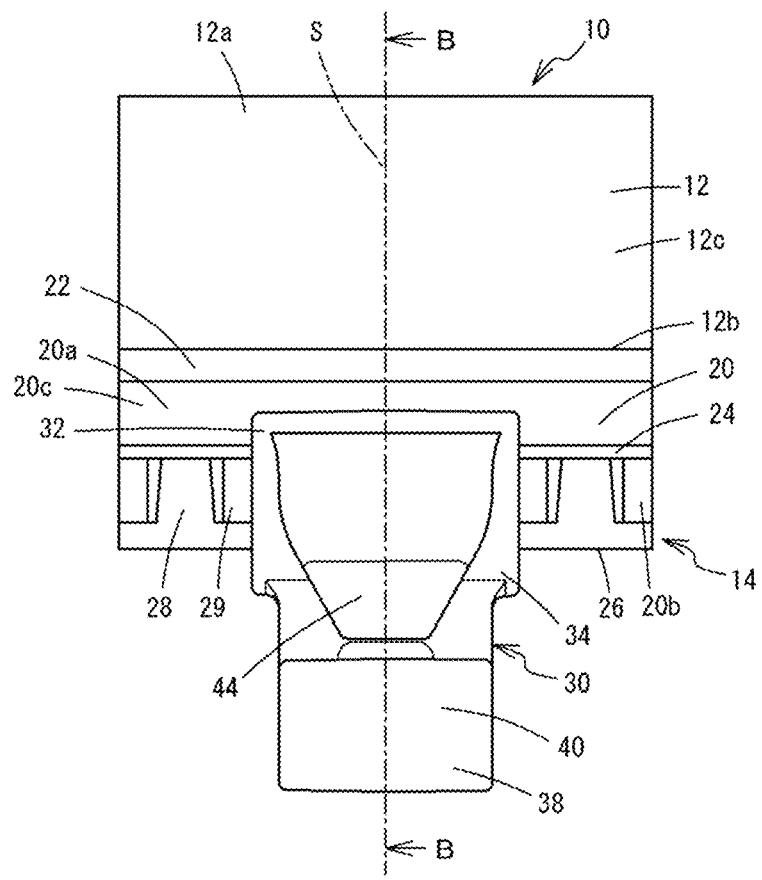
FIGS. 5A and 5B are respectively a front view and a bottom view showing a locking clip attached to a part of the continuous cover-material fastening end member according to the present embodiment.
Figure 5B:
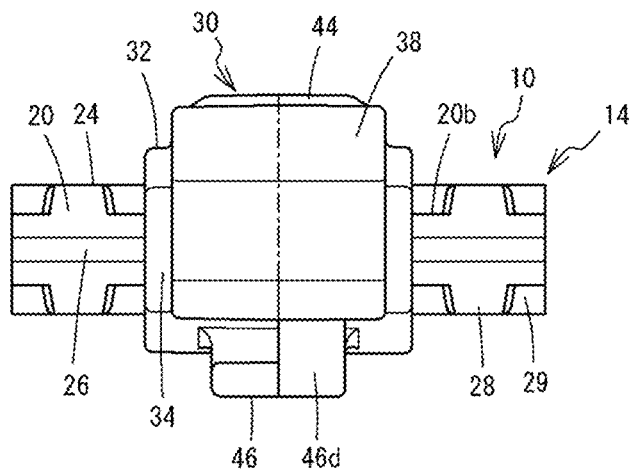

A cross-sectional shape of the wire guide piece 46 in the X-axis direction is formed to have a constant width slightly shorter than the width of the locking claws 32 and also shorter than the width of the hook 38. A part of the wire guide piece 46, which extends from the second bent portion 46b to the distal end portion 46c, is configured such that a left half thereof with respect to the center line S in FIG. 5A is cut out and the right half thereof forms an elastic piece portion 46d. The elastic piece portion 46d of the wire guide piece 46 is remained uncut to have a width about half that of the wire guide piece 46, and thus a lower surface thereof forms a guide surface as described below. That is, the wire guide piece 46 is formed such that a width of the elastic piece portion 46d in the X-axis direction is half that of a part thereof, which extends from the locking portion 31 to the second bent portion 46b.

The distal end portion 46c of the elastic piece portion 46d of the wire guide piece 46 and the distal end piece 38e of the hook 38 are provided to be spaced from each other along an inserting direction of the wire 15, i.e., a direction parallel to the X-axis direction. As used herein, the term 'spaced' means a state where their positions are offset in the X-axis direction and also a state where, when one side is projected in a direction perpendicular to the X-axis direction, the one side is likely to be in contact with the other side, but does not overlap therewith. The wire guide piece 46 and the hook 38 are provided to coincide with the X-axis direction at the vicinities of their base end portions. However, since the half of the distal end portion 46c of the wire guide piece 46 is cut out and also the half of the distal end portion 38e of the hook 38 is cut out, the distal end portions are spaced from each other and positioned in a staggered manner. That is, a center line of the elastic piece portion 46d of the wire guide piece 46, which extends from the second bent portion 46b to the distal end portion 46c, and a center line of a part of the hook 38, which extends from the middle of the distal end portion 38e in the protruding direction thereof to an end surface 38g thereof, are positioned to be spaced from and parallel to each other along the direction parallel to the X-axis direction, which is the inserting direction of the wire 15. Also, the lower surface of the elastic piece portion 46d of the wire guide piece 46 is formed to be parallel to a direction in which the groove portion 38f of the hook 38 extends (X-axis direction).

A wire insertion opening 39 configured to allow the wire 15 to be inserted therethrough is defined between the wire guide piece 46 and the hook 38. The wire insertion opening 39 is configured to be slightly narrower than the wire 15, thereby preventing the wire 15 from falling out after being inserted therethrough and thus reliably holding the wire 15 in the wire holding space 37.

Next, operations of locking the fixing clip 30 on the cover-material fastening end member 10 according to the present embodiment and then stretching the cover material 18 on the cushion material 16 will be described. First, the end edge portion 18a of the cover material 18 is sewn on the band-shaped member 12 by the sewing thread 17. Then, the fixing clip 30 is attached at a predetermined location on the cover-material fastening end member 10. At this time, a plurality of fixing clips 30 are attached along the longitudinal direction of the locking member 14 at predetermined intervals. For attachment, the locking member 14 of the cover-material fastening end member 10 is inserted between the pair of locking claws 32. Thus, the end edge flange portion 26 of the locking member 14 passes between the distal end portions 32a and then the locking member 14 is inserted while the distal end portions 32a of the locking claws 32 abut against side surfaces of the rib portions 28. Thus, the locking claws 32 are gradually elastically deformed to widen between the distal end portions 32a. Then, if the middle flange portion 24 passes between the distal end portions 32a, the elastic deformation of the locking claws 32 is restored so that the distal end portions 32a of the pair of the locking claws 32 are positioned in a space between the middle flange portion 24 and the end edge flange portion 22 of the locking member 14. In this state, the locking claws 32 hold the middle flange portion 24 by the distal end portions 32a and thus are prevented from falling out therefrom. Also, at this time, the locking protrusions 36 of the locking claws 32 are fitted into the locking recess portion 29 of the locking member 14, and thus the fixing clip 30 is maintained at the predetermined location without being displaced in the X-axis direction, which is the longitudinal direction of the locking member 14.

Subsequently, the cover material 18 with the fixing clips 30 attached at predetermined locations thereon is arranged to coincide with a groove 16a of a predetermined cushion material 16, and then the hook 38 of each of the fixing clips 30 is pressed against the wire 15 by a finger or the like. At this time, it is preferable to move the fixing clip 30 in the right and left direction in order to cause the wire 15 to coincide with the wire insertion opening 39 of the fixing clip 30. In this state, if the fixing clip 30 is further pressed in, the wire 15 is guided along the claw-shaped portion 38c and thus is led into the wire insertion opening 39. When the fixing clip 30 is further pressed to be inserted into the groove 16a of the cushion material 16, the wire 15 is led into the wire insertion opening 39. Since the wire insertion opening 39 is smaller than a diameter of the wire 15, the wire insertion opening 39 does not allow the wire 15 to pass therethrough as it is. However, in this state, if the fixing clip 30 is further pressed from above, the wire guide piece 46 is elastically deformed so that the wire insertion opening 39 becomes wider than the diameter of the wire 15. As a result, the wire 15 enters the wire holding space 37 through the wire insertion opening 39. At this time, the wire 15 hits against the extension portion 38a of the hook 38, and after the wire 15 passes through the wire insertion opening 39, the elastic deformation of the wire guide piece 46 is restored. Therefore, attachment can be completed with a click feeling. Since the fixing clip 30 is locked on the wire 15 and also the fixing clip 30 is attached on the cover-material fastening end member 10, the cover material 18 is neatly attached on the surface of the cushion material 16 with the end edge portion 18a thereof inserted in the groove 16a.

On the other hand, when the fixing clip 30 is separated from the wire 15, a long rod-shaped jig (not shown) is used. The jig is provided with a locking portion at a distal end thereof, and the locking portion is inserted and pressed into a gap of a jig insertion opening of the jig receiving portion 40. Then, the locking portion on the distal end of the jig abuts against the jig receiving portion 40, and if the locking portion is further pressed in, the jig receiving portion 40 is elastically deformed and widened. If the locking portion passes therethrough, the shape of the jig receiving portion 40 is restored so that the locking portion is put in the jig holding space 42.

Subsequently, if the jig is drawn up, a moment is exerted on the fixing clip 30 so that the fixing clip 30 is rotated about the wire 15. Then, the wire 15 is guided by the claw-shaped portion 38c of the hook 38 and the distal end portion 46c of the wire guide piece 46 and thus is positioned in the wire insertion opening 39. In this state, when the fixing clip 30 is further drawn up, the wire 15 hits against the vicinity of the distal end portion 46c of the wire guide piece 46 so that the distal end portion 46c is elastically deformed, thereby widening the wire insertion opening 39. Eventually, the wire 15 passes through the widened wire insertion opening 39. In this way, the cover-material fastening end member 10 is separated from the wire 15 and thus the cover material 18 can be also separated from the cushion material 16.

According to the cover-material fastening end member 10 of the present embodiment, the locking member 14 is formed such that a second moment of inertia of a cross section thereof in the YZ plane with respect to the Y-axis direction is as large as possible. Even when the cover material 18 is attached on the cushion material 16, it is not easy for the cover-material fastening end member 10 to be bent in the Z-axis direction due to a tension of the cover material 18, thereby preventing occurrence of wrinkles on the cover material 18. In addition, the cover-material fastening end member 10 can be bent to some extent in the XY plane to conform to a shape of the cushion material 16 and also has a certain rigidity. Accordingly, the cover-material fastening end member 10 can attach the cover material 18 in a neatly stretched state and also reliably maintain the attached state. Therefore, the cover material 18 can be neatly attached without wrinkles on the whole, and also the attaching operation can be easily performed.

Next, a cover-material fastening end member 50 according to a second embodiment of the present invention will be described with reference to FIGS. 8 to 11. Herein, the same members as those of the foregoing embodiments are denoted by the same reference numerals and the descriptions thereof will be omitted. The cover-material fastening end member 50 according to the present embodiment has a configuration, in which a thickness of a center plate-shaped portion 20 is the same on both sides of a middle flange portion 24. Also, a width of locking recess portions 29 in the X-axis direction is formed to be wider than a width of rib portions 28 in the X-axis direction.

According to the cover-material fastening end member 50 of the present embodiment, effects similar to those of the foregoing embodiment can be achieved. Also, since the width of the locking recess portions 29 is wider than that of the rib portions 28, a position of the fixing clip 30 can be slightly adjusted even after the cover material 18 is attached on the cushion material 16 by the fixing clip 30. Therefore, the cover material 18 can be attached without wrinkles.

Next, a cover-material fastening end member 52 according to a third embodiment of the present invention will be described with reference to FIGS. 12 to 15. Herein, the same members as those of the foregoing embodiments are denoted by the same reference numerals and the descriptions thereof will be omitted. A locking member 54 of the cover-material fastening end member 52 according to the present embodiment has a configuration, in which the end edge flange portion 26 of the foregoing embodiments is not formed on a lower end portion 20b of a center plate-shaped portion 20. Also, a width of locking recess portions 29 in the X-axis direction is formed to be wider than a width of rib portions 28 in the X-axis direction.

According to the cover-material fastening end member 52 of the present embodiment, effects similar to those of the foregoing embodiments can be achieved. In particular, the cover-material fastening end member 52 can be applied to a seat requiring a relatively flexible locking member 54.

Next, a cover-material fastening end member 56 according to a fourth embodiment of the present invention will be described with reference to FIGS. 16 to 19. Herein, the same members as those of the foregoing embodiments are denoted by the same reference numerals and the descriptions thereof will be omitted. A locking member 58 of the cover-material fastening end member 56 according to the present embodiment has a configuration, in which relief portions 62 are respectively formed on both side edge portion of a middle flange portion 60. Also, a width of locking recess portions 29 in the X-axis direction is formed to be wider than a width of rib portions 28 in the X-axis direction.

According to the cover-material fastening end member 56 of the present embodiment, effects similar to those of the foregoing embodiments can be achieved. In particular, the cover-material fastening end member 56 can be easily bent in the XY plane due to the relief portions 62 of the middle flange portion 60, and thus can be used in a part of a cushion material having a more strongly curved shape.

Next, a cover-material fastening end member 64 according to a fifth embodiment of the present invention will be described with reference to FIGS. 20 to 23. Herein, the same members as those of the foregoing embodiments are denoted by the same reference numerals and the descriptions thereof will be omitted. A locking member 66 of the cover-material fastening end member 64 according to the present embodiment has a configuration, in which the end edge flange portion 22 of the foregoing embodiments is not formed on a holding portion 20a of a center plate-shaped portion 20. Also, a width of locking recess portions 29 in the X-axis direction is formed to be wider than a width of rib portions 28 in the X-axis direction.

According to the cover-material fastening end member 64 of the present embodiment, effects similar to those of the third embodiment can be achieved. The cover-material fastening end member 64 can be applied to a seat requiring a relatively flexible locking member 66.

Next, a cover-material fastening end member 68 according to a sixth embodiment of the present invention will be described with reference to FIGS. 24 to 27. Herein, the same members as those of the foregoing embodiments are denoted by the same reference numerals and the descriptions thereof will be omitted. A locking member 70 of the cover-material fastening end member 68 according to the present embodiment has a configuration, in which cutout portions 74 are respectively formed on both side edge portion of an end edge flange portion 72. Also, a width of locking recess portions 29 in the X-axis direction is formed to be wider than a width of rib portions 28 in the X-axis direction.

According to the cover-material fastening end member 68 of the present embodiment, effects similar to those of the fourth embodiment can be achieved. In particular, the cover-material fastening end member 68 can be easily bent in the XY plane due to the cutout portions 74 of the end edge flange portion 72, and thus can be used in a part of a cushion material having a more strongly curved shape.

Next, a cover-material fastening end member 76 according to a seventh embodiment of the present invention will be described with reference to FIGS. 28 to 31. Herein, the same members as those of the foregoing embodiments are denoted by the same reference numerals and the descriptions thereof will be omitted. A locking member 78 of the cover-material fastening end member 76 according to the present embodiment has a configuration, in which the middle flange portion 24 of the foregoing embodiments is omitted. Also, a width of locking recess portions 29 in the X-axis direction is formed to be wider than a width of rib portions 28 in the X-axis direction.

According to the cover-material fastening end member 76 of the present embodiment, effects similar to those of the third embodiment can be achieved.

Additionally, the cover-material fastening end member of the present invention is not limited to the foregoing embodiments, but detailed shapes, dimensions and the like thereof may be appropriately changed.

DESCRIPTION OF REFERENCE NUMERALS 10, 50, 52, 56, 64, 68, 76 Cover-Material Fastening End Member
12 Band-Shaped Member
12a, 12b End Edge Portion
14, 54, 58, 66, 70, 78 Locking Member
15 Wire
16 Cushion Material
18 Cover Material
20 Center Plate-Shaped Portion
20a Holding Portion
20b Lower End Portion
20c Surface
22, 26, 72 End Edge Flange Portion
24, 60 Middle Flange Portion
28 Rib Portion
29 Locking Recess Portion
30 Fixing Clip
32 Locking Claw
36 Locking Protrusion
38 Hook
46 Wire Guide Piece

The invention claimed is:

1. A cover-material fastening end member configured to be attached on an end edge of a cover material, comprising:
   a band-shaped member fixed on an end edge portion of the cover material; and
   a locking member integrally provided along a longitudinal direction on one end edge portion of the band-shaped member opposite to the other end edge portion thereof, on which the cover material is fixed, wherein the locking member is formed such that a width thereof in a direction perpendicular to a surface of the band-shaped member is wider than a width of the band-shaped member;
   wherein the locking member comprises:
      a center plate-shaped portion formed along the longitudinal direction of the one end edge portion of the band-shaped member;
      a flange portion provided along at least one end edge of the center plate-shaped portion along the longitudinal direction thereof, wherein the flange portion has a surface extending along the longitudinal direction of the end edge portion of the band-shaped member and perpendicular to a surface of the center plate-shaped portion; and
      a plurality of rib portions each having a surface intersecting with the center plate-shaped portion and the flange portion, wherein the rib portions are provided on the center plate-shaped portion along the longitudinal direction of the center plate-shaped portion at predetermined intervals,
   wherein a cross-sectional shape of the center plate-shaped portion in a plane perpendicular to the longitudinal direction is configured such that the flange portion and the rib portions are axisymmetric about the center plate-shaped portion, and
   wherein the flange portion comprises a middle flange portion symmetrically protruding from a location containing a centroid of the cross-sectional shape of the center plate-shaped portion.

2. The cover-material fastening end member according to claim 1, wherein on an end edge of the center plate-shaped portion opposite to the band-shaped member, an end edge flange portion is provided along the longitudinal direction to be parallel to the middle flange portion.

3. The cover-material fastening end member according to claim 2, wherein a width of the end edge flange portion provided on the end edge of the center plate-shaped portion as measured between left and right side edge portions of the end edge flange portion is narrower than a width of the middle flange portion as measured between left and right side edge portions of the middle flange portion at the centroid of the center plate-shaped portion.

4. The cover-material fastening end member according to claim 3, wherein the end edge flange portion is formed on both left and right side edge portions of the center plate-shaped portion in the longitudinal direction.

5. The cover-material fastening end member according to claim 1, wherein the center plate-shaped portion is formed such that a thickness of a part thereof on a side, on which the band-shaped member is provided, is thicker than a thickness of a part thereof near to an end edge thereof opposite to the band-shaped member.

6. The cover-material fastening end member according to claim 1, wherein the rib portions are formed such that a dimension thereof in the direction perpendicular to the surface of the band-shaped member is gradually decreased toward an end edge thereof opposite to a side, on which the band-shaped member is provided.

7. The cover-material fastening end member according to claim 6, wherein a width of the rib portions in the longitudinal direction of the band-shaped member is smaller than a width between adjacent rib portions.

8. The cover-material fastening end member according to claim 7, wherein the flange portion is configured such that a dimension thereof in the direction perpendicular to the surface of the center plate-shaped portion is smaller than a dimension thereof in an upward and downward direction perpendicular to the longitudinal direction of the center plate-shaped portion.

* * * * *

UNITED STATES PATENT AND TRADEMARK OFFICE
CERTIFICATE OF CORRECTION

Page 1 of 1

PATENT NO. : 10,993,547 B2
APPLICATION NO. : 16/087538
DATED : May 4, 2021
INVENTOR(S) : Wanli Zhang et al.

It is certified that error appears in the above-identified patent and that said Letters Patent is hereby corrected as shown below:

On the Title Page

In item (73), in Column 1, in "Assignee", Line 1, delete "Corporation" and insert -- Corporation, Tokyo (JP) --, therefor.

Signed and Sealed this
Sixteenth Day of November, 2021

Drew Hirshfeld
*Performing the Functions and Duties of the
Under Secretary of Commerce for Intellectual Property and
Director of the United States Patent and Trademark Office*